United States Patent
Doucet

(10) Patent No.: US 8,028,428 B2
(45) Date of Patent: Oct. 4, 2011

(54) TARGET FOR SURVEYING

(76) Inventor: Thierry Doucet, Sherbrooke (CA)

(*) Notice: Subject to any disclaimer, the term of this patent is extended or adjusted under 35 U.S.C. 154(b) by 0 days.

(21) Appl. No.: 12/641,407

(22) Filed: Dec. 18, 2009

(65) Prior Publication Data
US 2011/0146090 A1 Jun. 23, 2011

(51) Int. Cl.
*G01C 15/08* (2006.01)
(52) U.S. Cl. .......................................... 33/295
(58) Field of Classification Search .......... 33/295, 33/293
See application file for complete search history.

(56) References Cited

U.S. PATENT DOCUMENTS

| | | | |
|---|---|---|---|
| 3,066,577 A | 12/1962 | Gunderson | |
| 3,195,234 A | 7/1965 | Glidden et al. | |
| 3,199,209 A * | 8/1965 | Bergquist | 33/295 |
| 3,307,264 A | 3/1967 | Wolfe, Jr. | |
| 3,730,470 A * | 5/1973 | Mitchell | 248/274.1 |
| 3,824,666 A * | 7/1974 | Roodvoets et al. | 72/37 |
| 3,916,815 A | 11/1975 | Valley | |
| 4,290,207 A * | 9/1981 | Browning et al. | 33/295 |
| 4,644,661 A | 2/1987 | Bozzolato | |
| 4,779,955 A | 10/1988 | Schmanski | |
| 4,803,784 A * | 2/1989 | Miller | 33/293 |
| 5,579,585 A * | 12/1996 | Schaeffer | 33/295 |
| 6,185,055 B1 * | 2/2001 | Feist | 359/831 |

* cited by examiner

*Primary Examiner* — Christopher W Fulton

(57) ABSTRACT

An Improved target for surveying has a body including a connector member, a stem member connecting the connector member to the body, a spirit level member connected to a surface of the body, a rod member extending vertically from a top side of the body, and a horizontal line drawn on a vertical surface of the body; and a bracket adapted to be rigidly affixed to a wall or post member, the bracket including a receptacle member adapted to receive and rigidly hold the connector member in a chosen position.

7 Claims, 2 Drawing Sheets

TARGET FOR SURVEYING

FIELD OF THE INVENTION

The present invention relates generally to surveying equipment but more particularly to a target used in surveying.

BACKGROUND OF THE INVENTION

Land surveying has been around for centuries and although many new improvements in satellite and GPS technologies have made the task much easier and accurate, there is still a need for land based surveying. This method still relies on lining up with a reference point, also known as a target. The problem with conventional targets is that they are flat and that their range is rather limited because they cannot reflect back enough light for the measuring instrument to get a proper reading.

SUMMARY OF THE INVENTION

In view of the foregoing disadvantages inherent in the known devices now present in the prior art, the present invention, which will be described subsequently in greater detail, is to provide objects and advantages which are:

To provide for a target that is three dimensional so as to be more versatile and easier to get a reading from. The target has a highly reflective surface which increases its range. Moreover, the target has simple yet efficient means for setting it up perfectly horizontal.

The target is also very easy to install and remove from its socket, which makes the target reusable, unlike other targets which are disposable. The socket, which marks a spot permanently is also provided with a place to put an identifying label.

To attain these ends, the present invention generally comprises a target having a body including a connector member, a stem member connecting the connector member to the body, a spirit level member connected to a surface of the body, a rod member extending vertically from a top side of the body, and a horizontal line drawn on a vertical surface of the body; and a bracket adapted to be rigidly affixed to a wall or post member, the bracket including a receptacle member adapted to receive and rigidly hold the connector member in a chosen position.

The improved target has a body that is cylindrical and has a concentric axis adapted to be vertical with respect to level ground, such that the resulting top and bottom surfaces of the body are flat and its curved cylindrical surface is on its vertical side.

The spirit level member is attached to the top surface of the body. The connector member is formed in the shape of a ball member.

The receptacle member includes a curved inner surface adapted to snugly receive the ball member; and further includes a set screw adapted to lock the ball member in the chosen position within the curved receptacle portion.

The chosen position is adapted such that the body member becomes perfectly horizontal with respect to level ground.

The receptacle member includes a means for marking a spot permanently, such that the target can be disassembled and reassembled in the exact same position, thereby rendering the target as being reusable.

The receptacle member further includes an identifying label.

The bracket further includes holes adapted to receive mechanical fasteners for affixing the bracket to the wall or post member.

The rod member extends vertically from the concentric axis of the body.

The rod member, the spirit level member, and the connector member are respectively aligned in a common vertical plane.

The curved vertical cylindrical surface includes a highly reflective material.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

DETAILED DESCRIPTION OF THE PREFERRED EMBODIMENT

Figure 1:
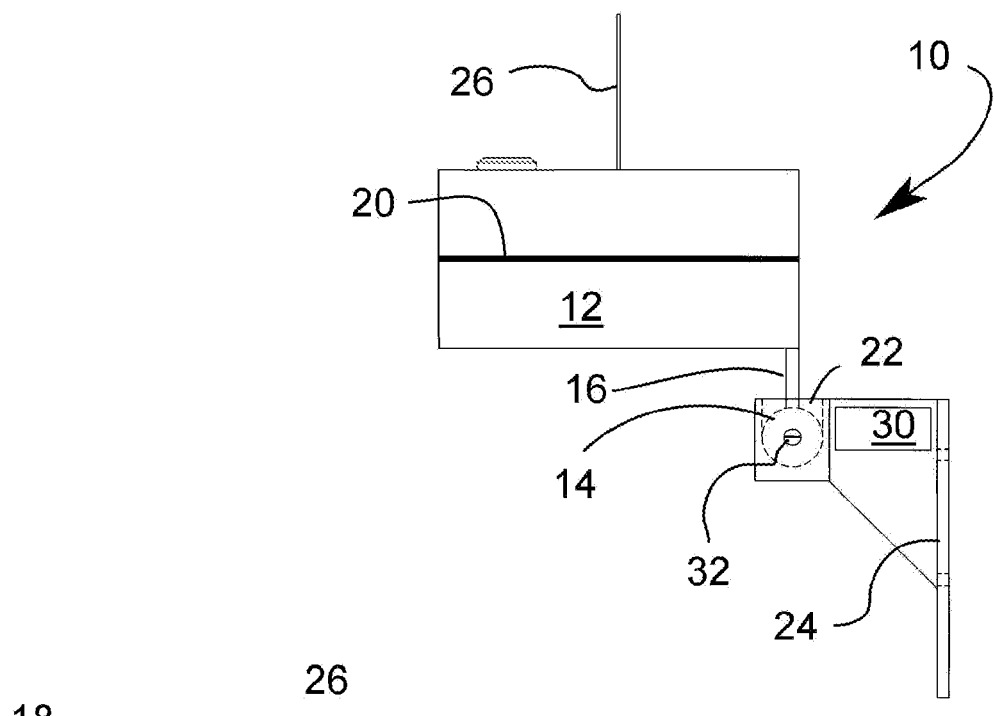
FIG. 1 Side view of the invention.
Figure 2:
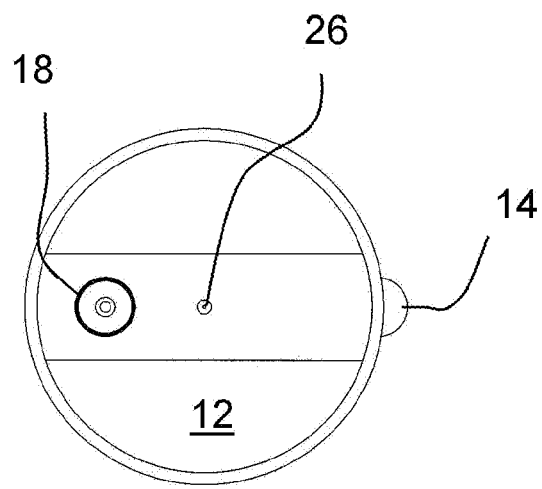
FIG. 2 Top view of the invention.
Figure 3A:
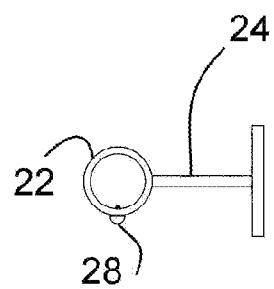
FIGS. 3A-c Top, front and side views, respectively, of the bracket.
Figure 3B:
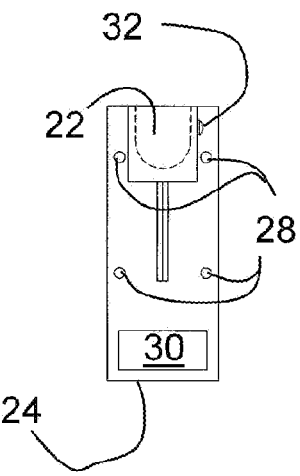
Figure 3C:
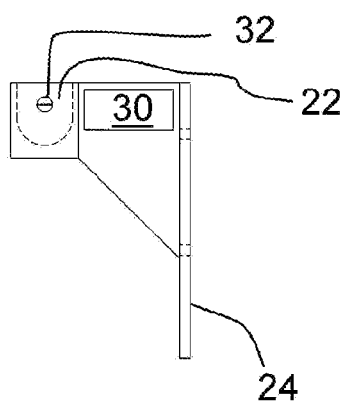

An improved target (10) for surveying has a cylindrically shaped body (12) having a ball shaped connector member (14) located underneath the body (12) and connected to it by way of a stem member (16) extending downwardly from the body (12). A spirit level (18) is used for leveling the body (12). A vertical rod member (26) extends perpendicularly from the top of the body (12), and a horizontal line (20) circles the diameter of the body (12). The connector member (14) fits inside a receptacle member (22) which forms an integral part of a bracket (24) which is permanently affixed to a surface such as a wall or a post. The bracket (24) has holes (28) for mechanical fasteners (not shown) and has a location for an identifying label (30).

When using the target (10), a user puts the connector member (14) in the receptacle member (22) and rotates it along various axes so as to move the body (12) in such a way so as to have the spirit level (18) show a perfect level. Once that is achieved, a set screw (32), located outside of the receptacle member (22), is tightened so as to lock to body (12) in place.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. An improved target for use with existing surveying equipment, said target comprising:
a body including a connector member, a stem member connecting said connector member to said body, a spirit level member connected to a surface of said body, a rod member extending vertically from a top side of said body, and a horizontal line drawn on a vertical surface of said body; and a bracket adapted to be rigidly affixed to a wall or post member, said bracket including a receptacle member adapted to receive and rigidly hold said connector member in a chosen position, said body is cylindrical and has a concentric axis adapted to be vertical with respect to level ground, such that the resulting top and bottom surfaces of said body are flat and its curved cylindrical surface is on its vertical side, said spirit level member is attached to said top surface of said body, said connector member is formed in the shape of a ball member, said rod member extends vertically from said concentric axis of said body.

2. The improved target of claim 1, wherein said receptacle member includes a curved inner surface adapted to snugly receive said ball member; and further includes a set screw adapted to lock said ball member in said chosen position within said curved receptacle portion.

3. The improved target of claim 1, wherein said chosen position is adapted such that said body member becomes perfectly horizontal with respect to level ground.

4. The improved target of claim 1, wherein said receptacle member further includes an identifying label.

5. The improved target of claim 1, wherein said bracket further includes holes adapted to receive mechanical fasteners for affixing said bracket to said wall or post member.

6. The improved target of claim 1, wherein said rod member, said spirit level member, and said connector member are respectively aligned in a common vertical plane.

7. The improved target of claim 1, wherein said curved vertical cylindrical surface includes a highly reflective material.

* * * * *